United States Patent [19]
Abel

[11] Patent Number: 4,815,228
[45] Date of Patent: Mar. 28, 1989

[54] BALANCING BRACKET FOR FLY CASTING TACKLE

[75] Inventor: Steven D. Abel, Camarillo, Calif.

[73] Assignee: Abel Automatics, Inc., Camarillo, Calif.

[21] Appl. No.: 159,716

[22] Filed: Mar. 28, 1989

[51] Int. Cl.[4] .............................................. A01K 87/06
[52] U.S. Cl. ...................................................... 43/22
[58] Field of Search ............................................ 43/22

[56] References Cited

U.S. PATENT DOCUMENTS 3,296,732  1/1967  Magnus .................................... 43/22
4,498,641  2/1985  Steudle .................................... 43/22

FOREIGN PATENT DOCUMENTS 772886  4/1957  United Kingdom .................... 43/22

Primary Examiner—M. Jordan
Attorney, Agent, or Firm—Workman, Nydegger & Jensen

[57] ABSTRACT

A balancing bracket with voids for fly casting tackle comprises a mount which is fixedly attached to a fly casting pole. A cantilever is integrally formed on the mount and extends therefrom in a direction which generally parallels the longitudinal axis of the pole. The cantilever is provided with means for selective fixed engagement with a fly casting reel at predetermined points along the cantilever.

5 Claims, 2 Drawing Sheets

BALANCING BRACKET FOR FLY CASTING TACKLE

FIELD OF THE PRESENT INVENTION

The present invention pertains generally to fishing tackle. More particularly, the present invention pertains to connectors for holding fishing reels on fishing poles. The present invention is particularly, but not exclusively, useful for holding a fly casting reel on a fly casting rod.

BACKGROUND OF THE PRESENT INVENTION

Fishing is an activity well known to mankind. References to this activity date from earliest recorded history as both a vocation and an avocation. Accordingly, as should be expected, there are many ways to catch fish and there is no need here to enumerate the vast varieties of fishing tackle which have been employed for this purpose. Instead, the specific focus here is on the particular tackle used by anglers in the type of sport fishing known as fly casting.

As may not be readily appreciated, fly casting requires its own unique tackle. This is so because, unlike other types of fishing, the object of fly casting is to place an artificial fly as close s possible to a preselected point on the surface of the water at a desired distance from the angler. Further, because fish, which are the object of the angler's interest, are accustomed to eating insects which alight on the water's surface for only brief periods of time, the fly casting angler must make repeated casts which move his artificial fly from point to point. It is well known that this operation is best accomplished using a long and relatively flexible pole with an artificial fly attached to the end of a fishing line extending from the tip of the pole.

The well known and accepted technique for fly casting requires the angler to grasp the handle grip of the pole and, by using a wrist and forearm action, cast the fly toward its intended point on the water. From a purely mechanical point of view, the greatest mechanical advantage for this operation is obtained by allowing the angler to grasp the pole as close to its base end as possible. Also, by concentrating the weight of the fishing tackle as close as possible to the point at which the angler grasps the pole, the moment of inertia of the tackle is reduced nd the angler obtains additional mechanical advantage in his casting.

These physical factors have been generally appreciated in the past. Consequently, for fly casting, the casting reel which is used to extend and take-up the line is attached to the pole near its base. While this configuration has gained universal acceptance, and is intended to provide the desired mechanical advantages stated above, several adverse consequences result. First, the angler is forced to grip the pole in front of the reel. This consequently limits establishment of the grip point to a location substantially forward of the base end of the pole. Second, this traditional configuration requires off-set cranking during the rewinding or taking-in of the line. Off-set cranking results when the hand grasping the pole is forward of the hand cranking the reel. As can be appreciated, off-set cranking causes pole wobble during rewinding and is, therefore, not mechanically efficient. Third, with the reel at the very base of the pole, there is no way for the angler to stand the pole against a wall or other structure without risking damage to the reel.

The present invention recognizes that the disadvantages of the prior art can be essentially eliminated and the mechanical advantages for fly casting tackle appreciably enhanced by a reconfiguration of the component elements. Specifically, the present invention recognizes that the fly casting reel can be mounted at a distance from the pole and slightly forward of the pole's base to realize these objectives. This allows the angler to grasp the pole closer to its base while the distance between the reel and the point where the angler grasps the pole is such that the tackle's moment of inertia remains unchanged or is even reduced when compared with conventional fly casting tackle. Additionally, the configuration fir fly casting tackle as disclosed for the present invention effectively eliminates off-set cranking and places the angler's hands in positions where he/she can achieve increased line speed and a consequent increase in the length of cast.

In light of the above, it is an object of the present invention to provide fly casting tackle which has enhanced performance characteristics. Still another object of the present invention is to provide a connector for attaching a fly reel to a fly casting pole in a manner that allows the angler to hold the pole closer to its base end. Another object of the present invention is to position the reel relative to the pole for an improved and easier cranking operation during rewind of the fishing line. Still another object is to provide fly casting tackle which permits increased line speed and consequent increased length of cast. Another object of the present invention is to provide a bracket which will keep the reel off the ground or floor when the pole is rested on its base end. Yet another object of the present invention is to provide a bracket for connecting a reel to a pole which is easy to use and relatively inexpensive to manufacture.

SUMMARY OF THE PRESENT INVENTION

A balancing bracket for holding a fly casting reel on a fly casting pole comprises a mount having means for fixedly attaching the bracket to the pole, and a cantilever extending from the mount having means for selective fixed attachment of the fly casting reel to the bracket. In accordance with the present invention, the mount of the bracket is affixed to a foot which is attached to the base of the pole by the engagement of extensions on the foot with retaining rings operatively placed on the pole. With this engagement, the cantilever is positioned at a distance from the pole and directed along an axis which is generally parallel to the longitudinal axis of the pole.

The cantilever may be formed with a pair of rings or clamps placed along the longitudinal axis of the cantilever which are adapted for engagement with a foot which is attached to the fly casting reel. In an alternate embodiment, the cantilever is formed with a groove and an adjustable screw on the reel is engageable with the groove in a manner which allows a sliding movement of the reel along the cantilever whenever the screw is loosened. When the screw is tightened the reel is fixedly held on the cantilever.

In yet another embodiment of the present invention, the groove in the cantilever can be eliminated and replaced by a single attachment point. In either event, the cantilever is formed with means suitable for engagement with a fly casting reel.

The bracket can be formed with voids to decrease the weight of the bracket. Specifically, a series of holes can be randomly drilled through or into the bracket for this purpose.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENTS

Figure 1:
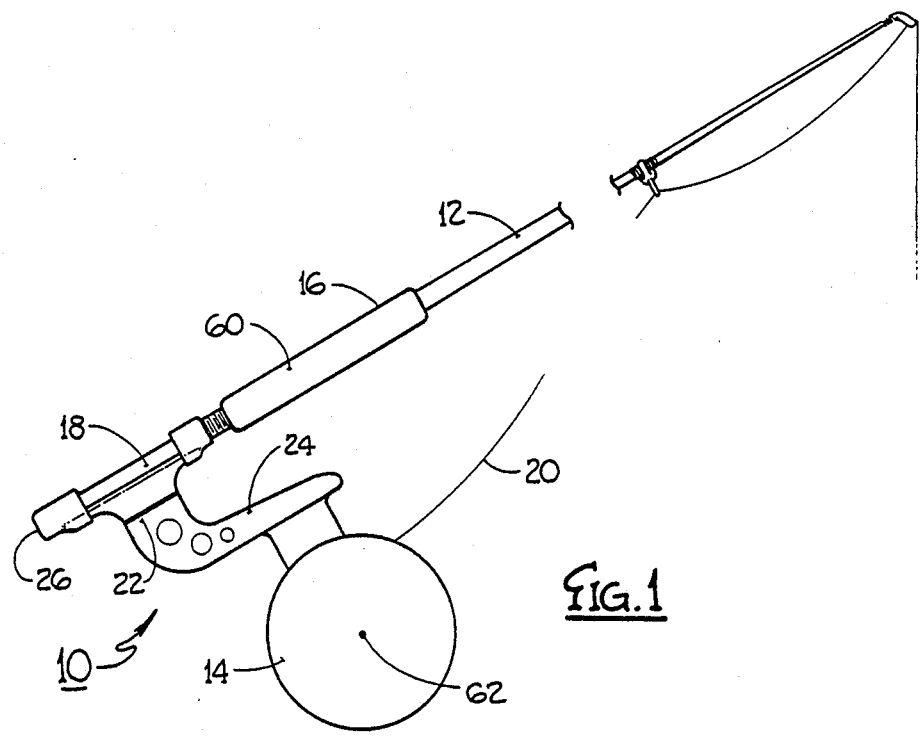
FIG. 1 is a side elevational view of the bracket of the present invention connecting a reel to a pole.

Referring initially to FIG. 1, a balancing bracket generally designated 10 is shown in combination with a fly casting pole 12 and a fly casting reel 14. Specifically, fly casting pole 12 may be of any variety well known in the art and, likewise, fly casting reel 14 may be of any type well known in the pertinent art. Typically, as shown in FIG. 1, fly casting pole 12 includes a handle grip 16 and a reel seat 18. As will be appreciated by the experienced angler, a fishing line 20 is operatively wound around a spool (not shown) which is included in fly casting reel 14. Also, a fishing line 20 extends from reel 14 along pole 12 in a manner which allows the operator to let out line 20 or rewind line 20 as desired. In accordance with the present invention, balancing bracket 10 is provided as an interconnection between pole 12 and reel 14.

With specific attention to balancing bracket 10, it will be seen in FIG. 1 that balancing bracket 10 is generally L-shaped and comprises a mount 22 and an integral cantilever 24 which is substantially perpendicular to mount 22. As shown in FIG. 1, balancing bracket 10 is connected with pole 12 in a manner which will cause cantilever 24 to extend substantially in the direction of the longitudinal axis of pole 12 and parallel thereto. The result is that reel 14 is positioned at a distance from pole 12 and forward of the pole base end 26 for purposes to be subsequently discussed.

Figure 2:
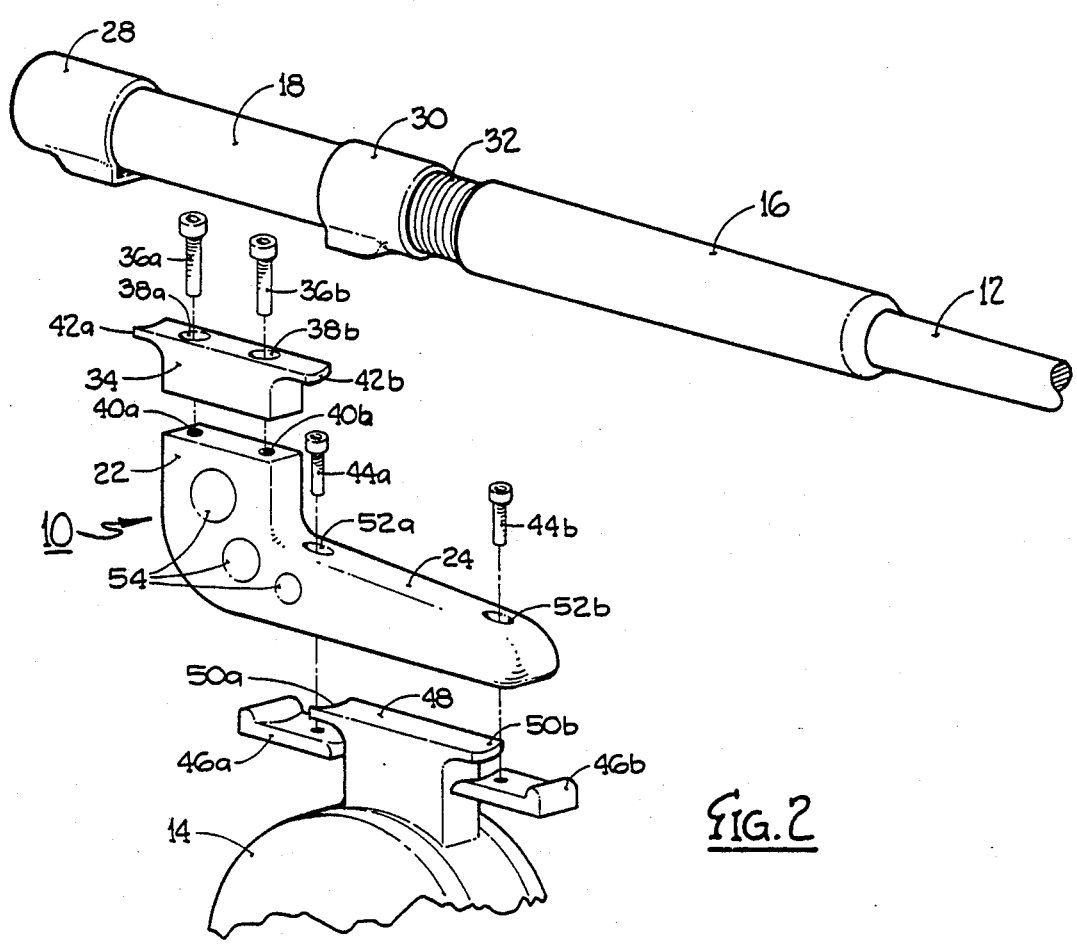
FIG. 2 is an exploded perspective view of the bracket of the present invention in cooperative relationship with a pole and a reel.

The association of components of the present invention in cooperation with pole 12 and reel 14 will be best seen by reference to FIG. 2. In FIG. 2, it is seen that reel seat 18 of pole 12 is provided with a stationary retaining ring 28 and an adjustable retaining ring 30. Further, a locking screw 32 is threadably engaged with pole 12 for the purpose of advancing the adjustable retaining ring 30 toward stationary retaining ring 28 for a purpose to be subsequently disclosed.

As will be appreciated by reference to FIG. 2, a foot 34 is fixedly attached to or incorporated in balancing bracket 10 by screws 36a and 36b. Specifically, screws 36a and 36b are respectively inserted through holes 38a and 38b for engagement with holes 40a and 40b on mount 22 of balancing bracket 10. In an alternate embodiment, foot 34 can be integrally formed with bracket 10 to present a component having unitary construction. With either structure, foot 34 is fixedly attached to balancing bracket 10, and it will be appreciated by the skilled artisan that foot 34 can be held against reel seat 18 by the respective insertion of extension 42a into stationary retaining ring 28 and insertion of extension 42b into adjustable retaining ring 30. Once extensions 42a and 42b have been respectively inserted into stationary retaining ring 28 and adjustable retaining ring 30, locking screw 32 can be advanced to cause an interference fit between foot 34 and the retaining rings 28 and 30.

Fly casting reel 14 is fixedly attached to cantilever 24 of balancing bracket 10 by the respective interaction of screws 44a and 44b with clamps 46a and 46b. More specifically, with foot 48 of reel 14 positioned against cantilever 24 of balancing bracket 10, screws 44a and 44b are respectively insertable through holes 52a and 52b of cantilever 24 for threadable engagement with clamps 46a and 46b. Clamps 46a and 46b are then respectively engaged with extensions 50a and 50b. It will be appreciated by the skilled artisan that the interaction between screws 44a, 44b and clamps 46a, 46b against extensions 50a and 50b, holds foot 48 of fly casting reel 14 against cantilever 24 of balancing bracket 10.

The weight of balancing bracket 10 can be reduced by drilling voids 54 into balancing bracket 10 substantially as shown in FIG. 2. It will be appreciated that the weight of balancing bracket 10 is also dependent upon the particular material used for its manufacture. In the operation of the present invention, the weight of balancing bracket 10 should be minimized.

Figure 3:
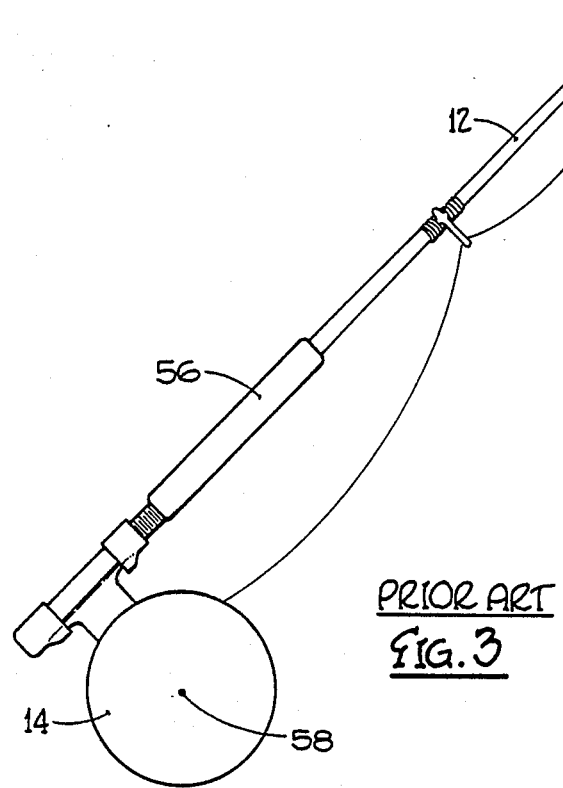
FIG. 3 is a side elevational view of a prior art connector holding a reel on a pole.
Figure 4:
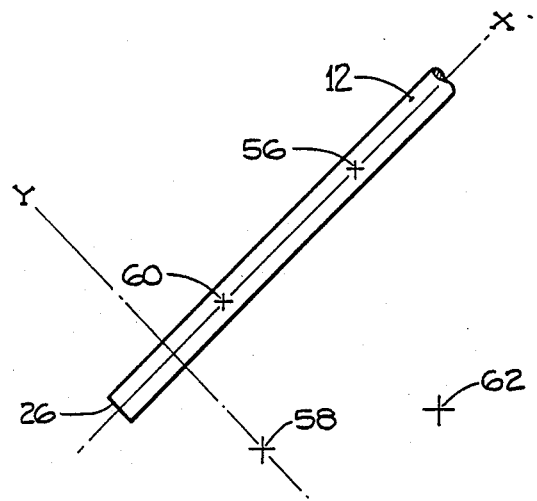
FIG. 4 is a schematic of a pole showing movement of the grip point nd the center of gravity of the reel with incorporation of the bracket of the present invention.

The mechanical advantage to be obtained by incorporation of balancing bracket 10 with fly casting tacklet will perhaps be best appreciated by cross referencing FIGS. 1, 3 and 4. FIG. 3 is a representation of the traditional fly casting tackle. More specifically, FIG. 3 shows the cooperation of structure between fishing reel 14 and pole 12 as presently practiced. It will be appreciated from FIG. 3 that grip point 56 is the approximate location on pole 12 where the action of the operator's grip on the pole 12 is effective. Further, it will be appreciated that the center of gravity of fly casting reel 14 will be in the general location of point 58. Correspondingly, grip point 60 and reel center of gravity 62 are shown in FIG. 1 for fly casting tackle incorporating the present invention. The comparison of mechanical advantages between traditional fly casting tacklet shown in FIG. 3 and fly casting tackle incorporating the present invention will be best appreciated by reference to FIG. 4.

In FIG. 4 an x-y cartesian coordinate system is established relative to fishing pole 12. Within this coordinate system, traditional fly casting tackle would have grip point 56 and center of gravity 58 substantially as shown. The incorporation of a balancing bracket 10 as an interconnection between fishing pole 12 and fishing reel 14 generally establishes the grip point 60 and reel center of gravity 62 as shown in FIG. 4. Specifically, with the incorporation of balancing bracket 10, grip point 60 is moved closer to the base end 26 of pole 12 and the center of gravity 62 for reel 14 is moved forward and to some extend away from the x-axis or longitudinal axis of fishing pole 12. It will be readily appreciated by the skilled artisan that movement of the grip point from 56 to 60 provides the angler with mechanical advantage in his casting action of pole 12. Further, it will be appreciated by the skilled artisan that the movement of the center of gravity of reel 14 from 58 to point 62 will result in a change in the moment of inertia of the fly casting tackle. With these mechanical advantages, the objects of the present invention may be realized.

While the particular fly casting tackle and incorporated balancing bracket as herein shown and disclosed in detail are fully capable of obtaining the objects and providing the advantages herein before stated, it is to be understood that they are merely illustrative of the presently preferred embodiments of the present invention and that no limitations are intended to the details of construction or design herein shown other than as defined in the appended claims.

I claim:

1. A bracket for connecting a fly reel to a fishing pole having a base end which comprises:
   a mount;
   means to attach said mount to said pole;
   a cantilever integral with said mount and extending substantially perpendicular therefrom in a direction substantially parallel to the longitudinal axis of said pole, said cantilever and said mount being formed with voids to lighten said bracket;
   a plurality of retaining rings operatively associated with said pole;
   a foot fixedly attached to said mount, said foot having extensions engageable with said retaining rings for attaching said bracket to said pole; and
   means for attaching said reel to said cantilever to distance said reel from said pole and position said reel forward of said base end of said pole.

2. A bracket as recited in claim 1 further comprising means for adjustably attaching said reel to said bracket.

3. A bracket as recited in claim 2 wherein said adjustable means is a groove formed on said cantilever for attachably receiving an engaging means mounted on said reel.

4. Fly casting tackle which comprises:
   a pole having a base end;
   a reel;
   a substantially L-shaped bracket fixedly attached to said pole, said bracket having a cantilever extending therefrom in a direction substantially parallel to the longitudinal axis of said pole, said cantilever being distanced from said pole, said bracket being formed with voids to lighten said bracket; and
   means engageable with said cantilever and said reel for holding said reel against said cantilever.

5. Fly casting tackle as recited in claim 4 wherein said reel is attached to said cantilever with said reel distanced from said pole and said reel positioned forward of said base end of said pole.

* * * * *